(12) United States Patent
Lan

(10) Patent No.: US 6,657,857 B2
(45) Date of Patent: Dec. 2, 2003

(54) DISK DRIVE ASSEMBLY WITH A DISK DRIVE MODULE ROTATABLE ON A CHASSIS BETWEEN AN EXPOSED POSITION AND A CONCEALED POSITION

(75) Inventor: Hao-Jui Lan, Hsinchu Hsien (TW)

(73) Assignee: Mitac International Corp., Hsinchu Hsien (TW)

( * ) Notice: Subject to any disclaimer, the term of this patent is extended or adjusted under 35 U.S.C. 154(b) by 0 days.

(21) Appl. No.: 10/059,875

(22) Filed: Jan. 29, 2002

(65) Prior Publication Data

US 2003/0142475 A1 Jul. 31, 2003

(51) Int. Cl.⁷ .................................................. G06F 1/16
(52) U.S. Cl. ...................... 361/685; 361/681; 361/729; 312/223.2; 248/300
(58) Field of Search ................................ 361/681, 682, 361/683, 685, 724–729, 686, 740, 759, 816, 818; 312/223.2, 223.3, 223.1, 322.1, 330.1; 211/26, 41.17, 41.18, 70.1, 71.01, 72–73, 189, 190; 174/35 GC, 35 R, 51; 248/300; 292/300, 302, 349, 124; G06F 1/16

(56) References Cited

U.S. PATENT DOCUMENTS 5,107,400 A * 4/1992 Kobayashi .................. 361/685
5,572,402 A * 11/1996 Jeong ......................... 361/685
5,995,364 A * 11/1999 McAnally et al. .......... 361/685
6,185,103 B1 * 2/2001 Yamada ...................... 361/727
6,188,569 B1 * 2/2001 Minemoto et al. .......... 361/683
6,273,273 B1 * 8/2001 Liao ............................ 211/26
6,445,576 B1 * 9/2002 Wooden et al. ............. 361/683
6,519,138 B1 * 2/2003 Olson et al. ................. 361/683
6,530,551 B2 * 3/2003 Gan ............................ 248/694

FOREIGN PATENT DOCUMENTS

JP         408129864 A  *  5/1996 ........... G11B/33/02

* cited by examiner

*Primary Examiner*—Michael Datskovsky
(74) *Attorney, Agent, or Firm*—Merchant & Gould P.C.

(57) ABSTRACT

A disk drive assembly includes a chassis adapted to be fixed on a computer housing, a module-mounting seat rotatable on the chassis between an exposed position and a concealed position, and a disk drive module attached to the seat. When the seat is disposed at the exposed position, the module is exposed within an opening in the computer housing, thereby permitting insertion of a recording medium into the module. When the seat is disposed at the concealed position, the module is deflected from the opening and is concealed entirely within the computer housing.

8 Claims, 14 Drawing Sheets

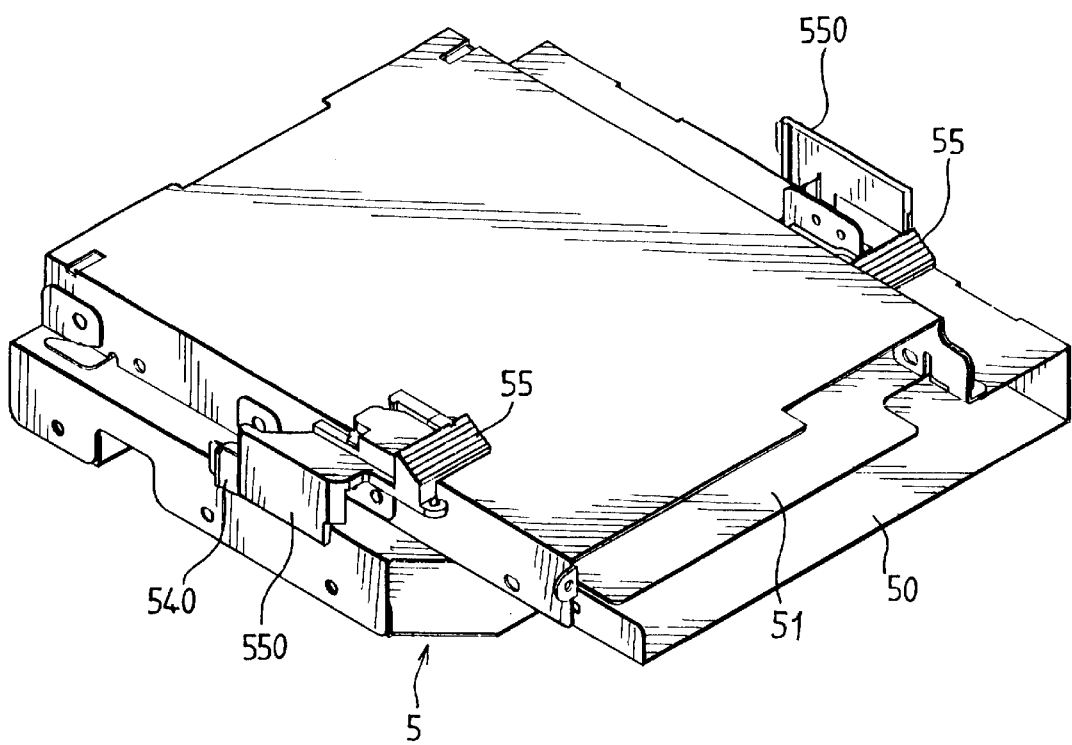
F I G. 5

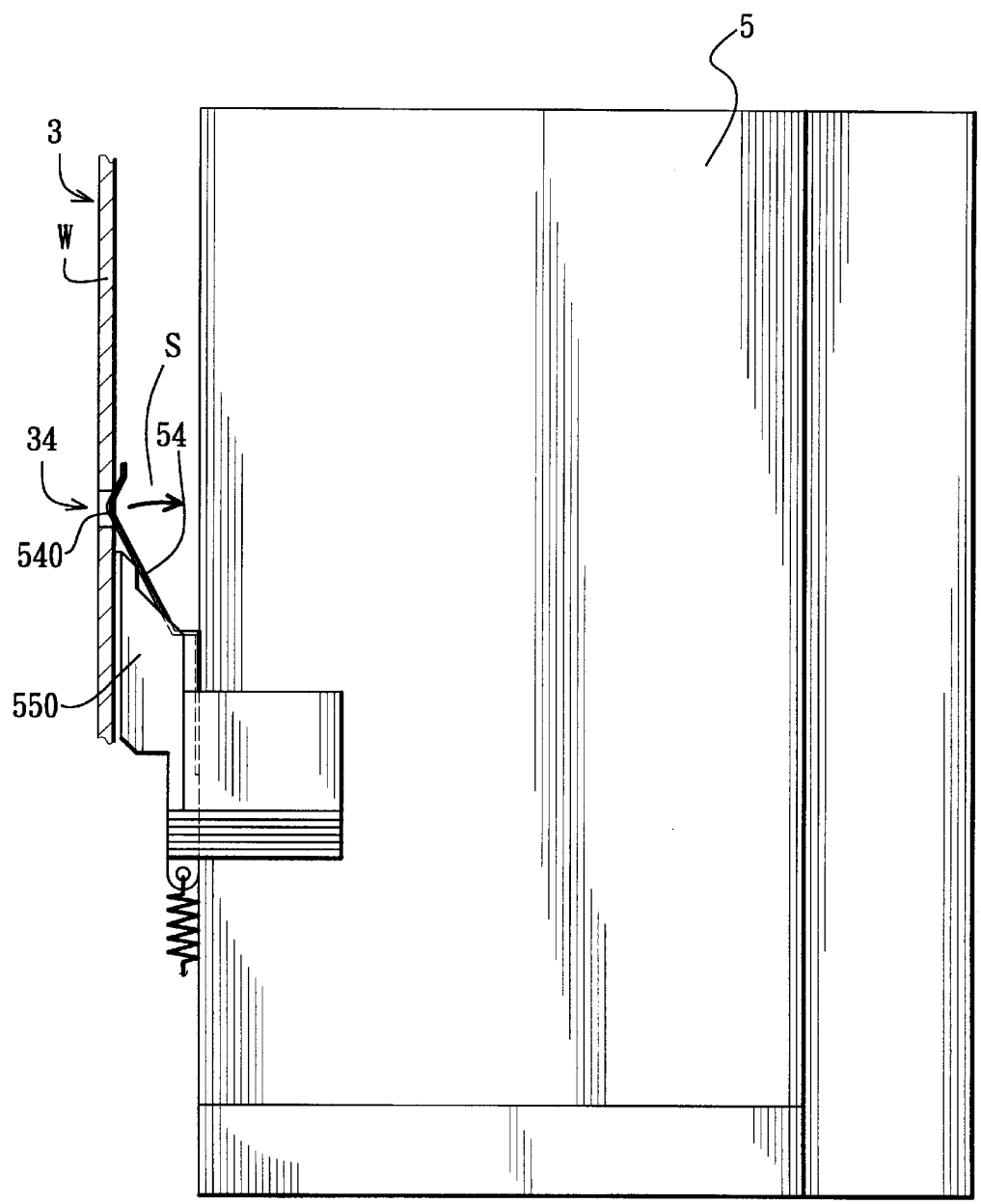
F I G. 5B

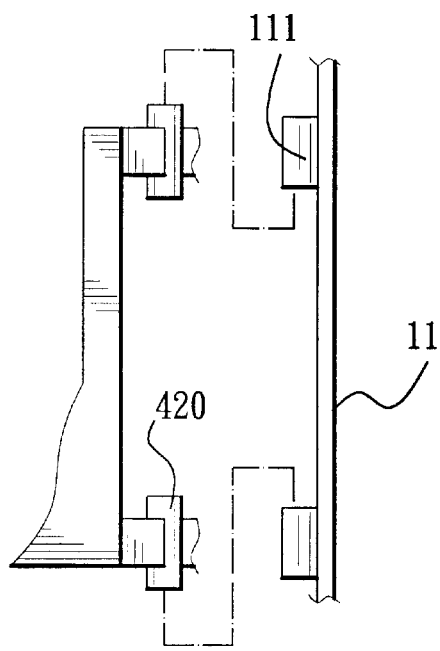
F I G. 7A
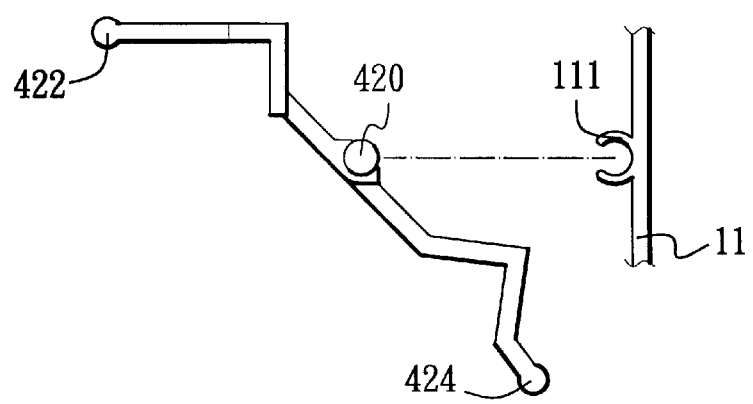
F I G. 7B

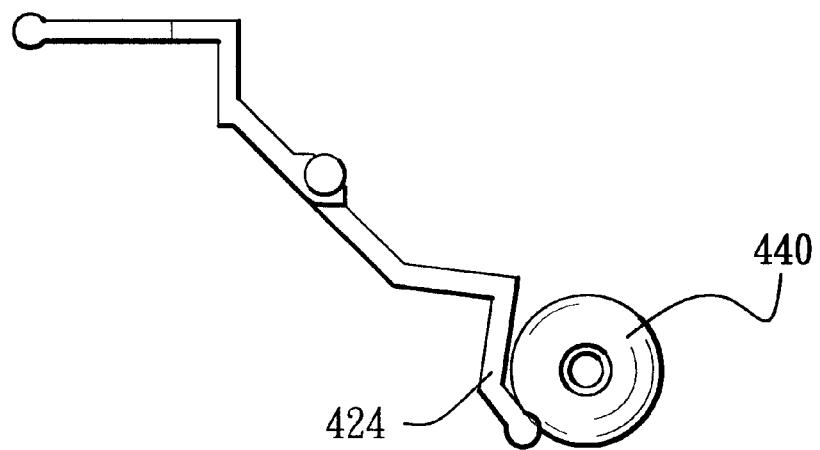
F I G. 7C
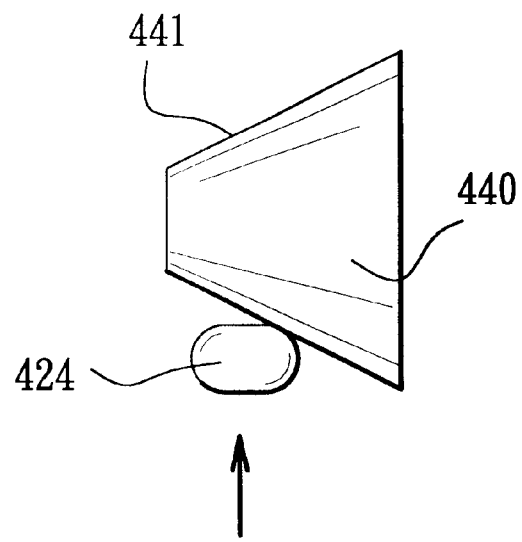
F I G. 7D

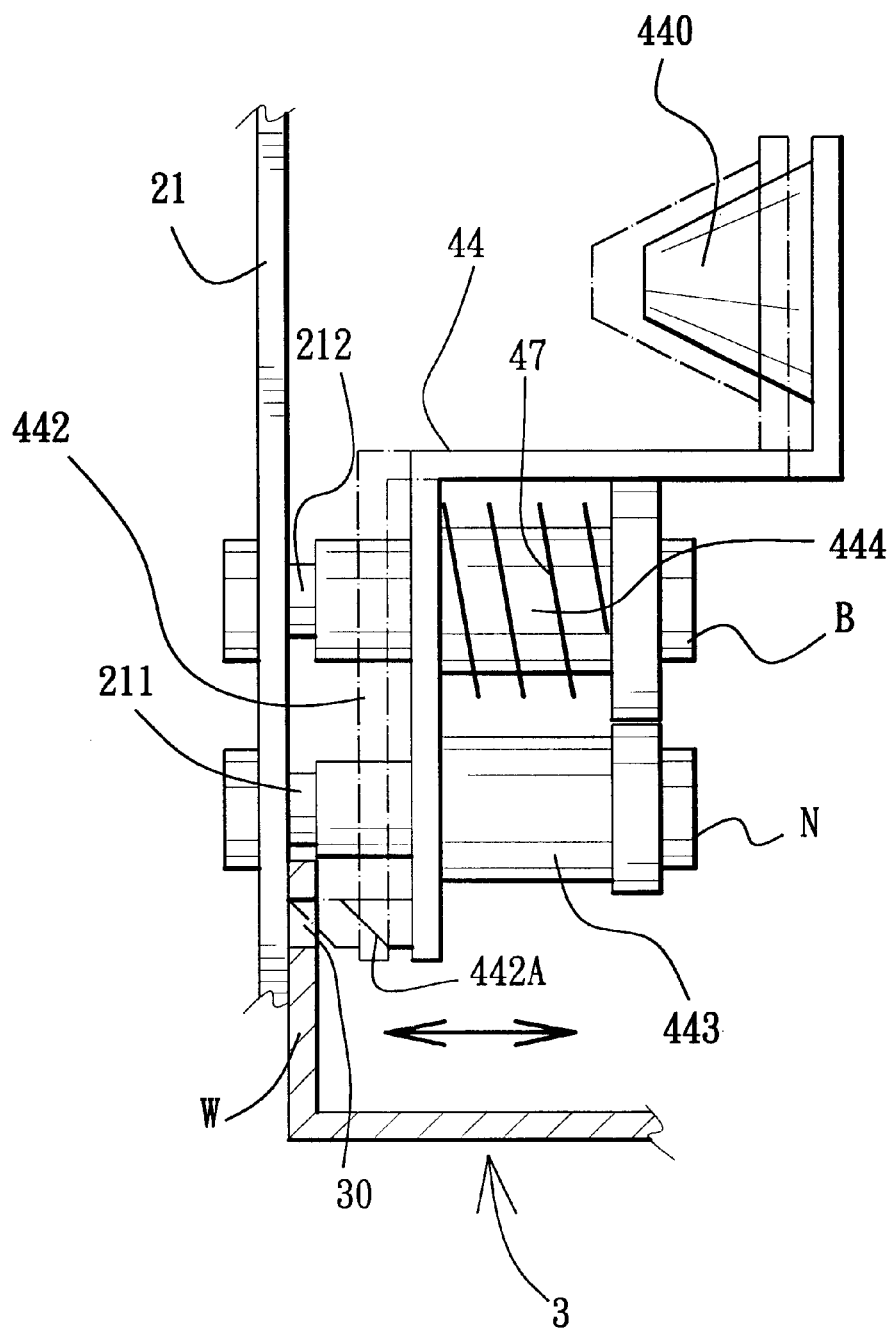
F I G. 7E ively to this invention, with reference

DISK DRIVE ASSEMBLY WITH A DISK DRIVE MODULE ROTATABLE ON A CHASSIS BETWEEN AN EXPOSED POSITION AND A CONCEALED POSITION

BACKGROUND OF THE INVENTION

1. Field of the Invention

This invention relates to a disk drive assembly, and more particularly to a disk drive assembly, which includes a disk drive module that is rotatable on a chassis between an exposed position, where a recording medium can be inserted into the module, and a concealed position, where the module is concealed entirely within a computer housing.

2. Description of the Related Art

Referring to FIG. 1, a conventional personal computer 1 is shown to include a base 10, a computer housing (10A), and an LCD monitor (10B). The computer 1 is defective in design in that dust, sunlight, and water can gain access to an optical-disk drive 101 and a floppy-disk drive 102 via a plurality of slits or slots 103 in an outer surface of the computer housing (10A).

SUMMARY OF THE INVENTION

The object of this invention is to provide a disk drive assembly with a disk drive module that can be concealed entirely.

According to this invention, a disk drive assembly includes a chassis adapted to be fixed on a computer housing, a module-mounting seat rotatable on the chassis between an exposed position and a concealed position, and a disk drive module attached to the seat. When the seat is disposed at the exposed position, the module is exposed within an opening in the computer housing, thereby permitting insertion of a recording medium into the module. When the seat is disposed at the concealed position, the module is deflected from the opening and is concealed entirely within the computer housing.

BRIEF DESCRIPTION OF THE DRAWINGS

These and other features and advantages of this invention will become apparent in the following detailed description of a preferred embodiment of this invention, with reference to the accompanying drawings, in which:

FIG. 5 is an assembled perspective view of a disk drive module of the preferred embodiment;

FIG. 5B is a schematic top view of the preferred embodiment, illustrating how a slider is disposed between the seat and the module;

FIGS. 7A and 7B are schematic fragmentary top and side views of the preferred embodiment, illustrating how a crank element is mounted pivotally on a computer housing;

FIG. 7C is a schematic fragmentary side view of the preferred embodiment, illustrating how the crank element engages an inclined surface of a projection of an engaging element;

FIG. 7D is a schematic fragmentary sectional view of the preferred embodiment, illustrating how the crank element engages the inclined surface; and FIG. 7E is a schematic fragmentary top view of the preferred embodiment, illustrating how the engaging element is moved to engage a hole in the seat.

DETAILED DESCRIPTION OF THE PREFERRED EMBODIMENT

Figure 1:
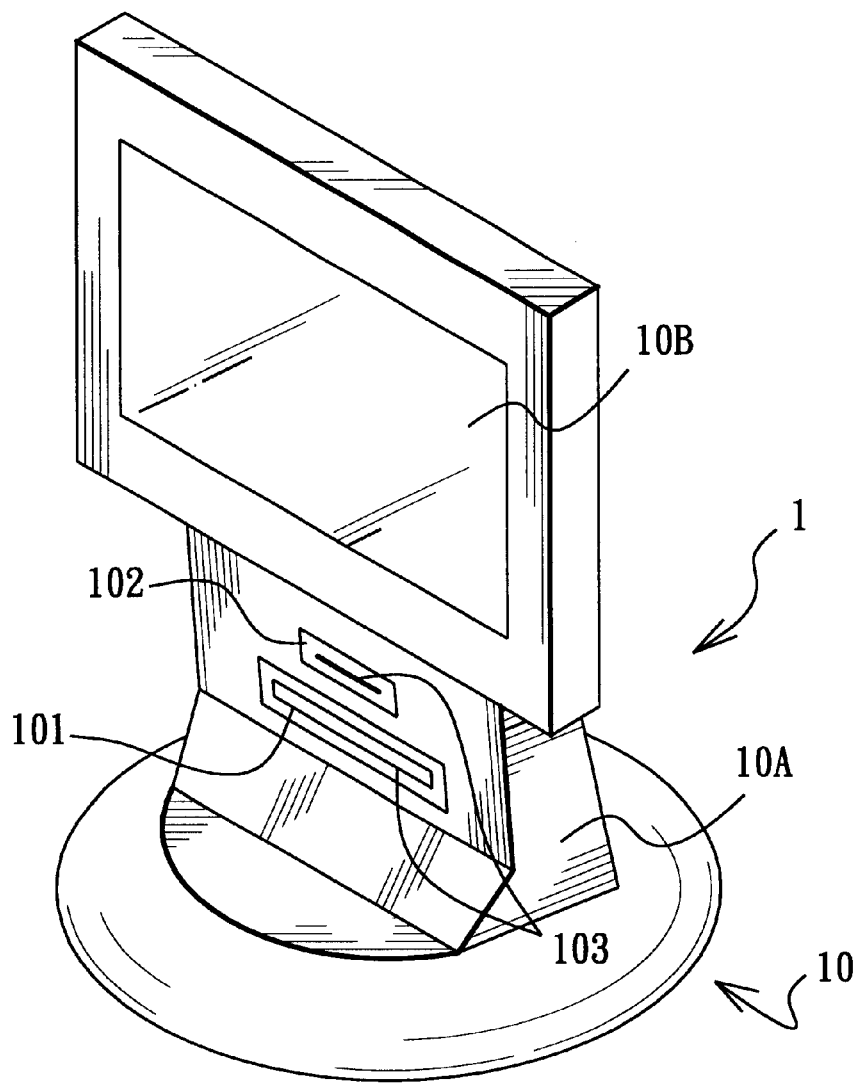
FIG. 1 is an assembled perspective view of a conventional portable computer.
Figure 2:
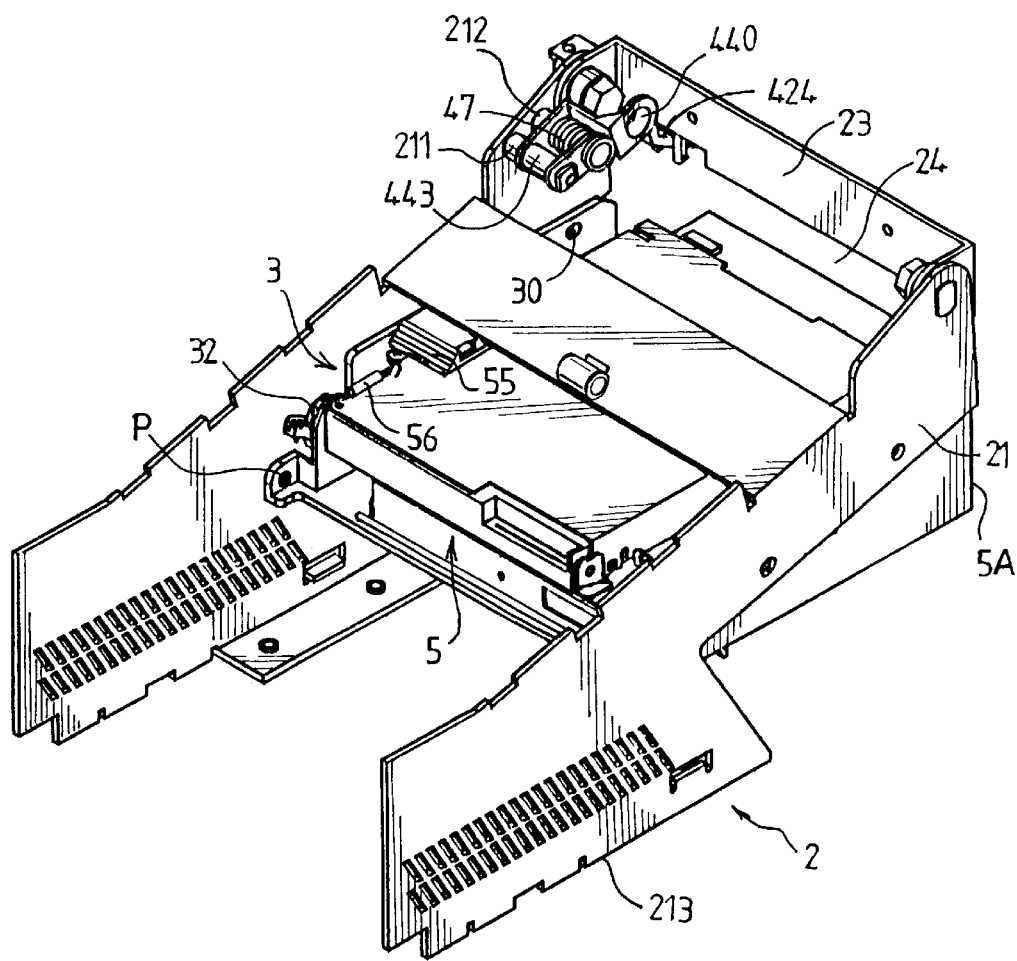
FIG. 2 is an assembled perspective view of the preferred embodiment of a drive disk assembly according to this invention when a module-mounting seat is disposed at an exposed position.
Figure 6:
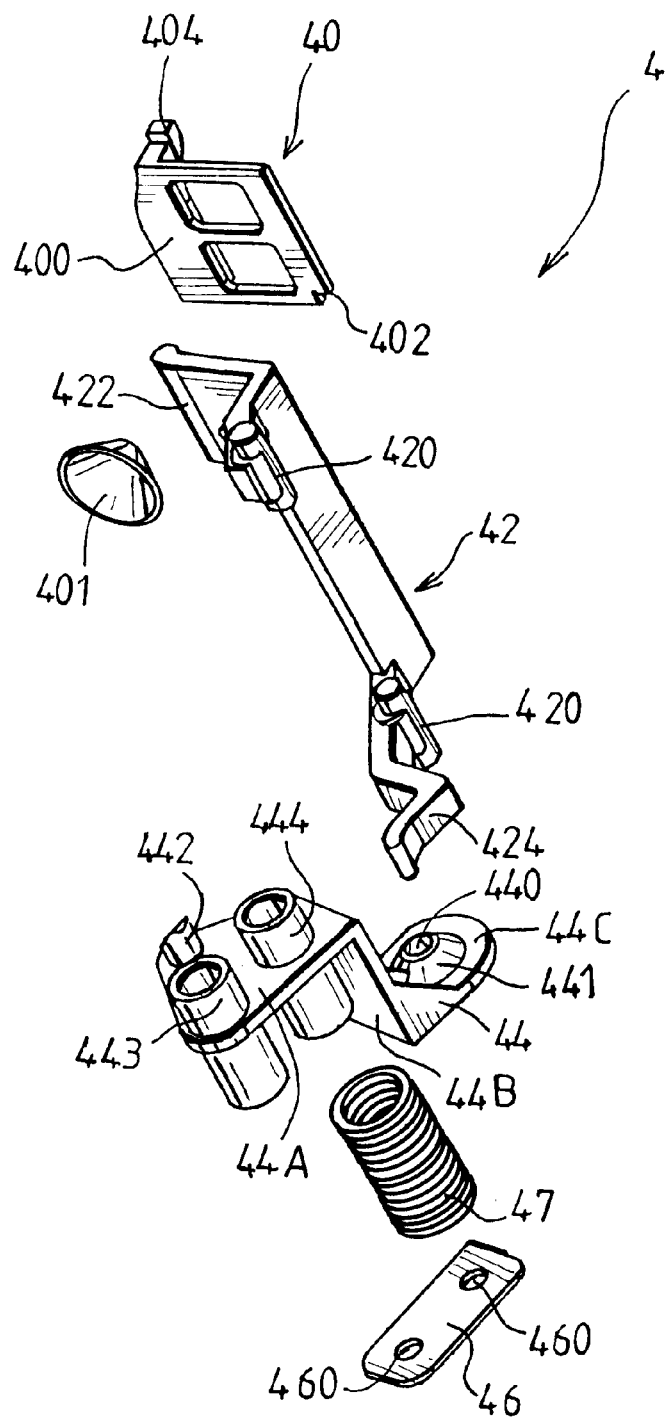
FIG. 6 is an exploded perspective view of a driving mechanism of the preferred embodiment.
Figure 7:
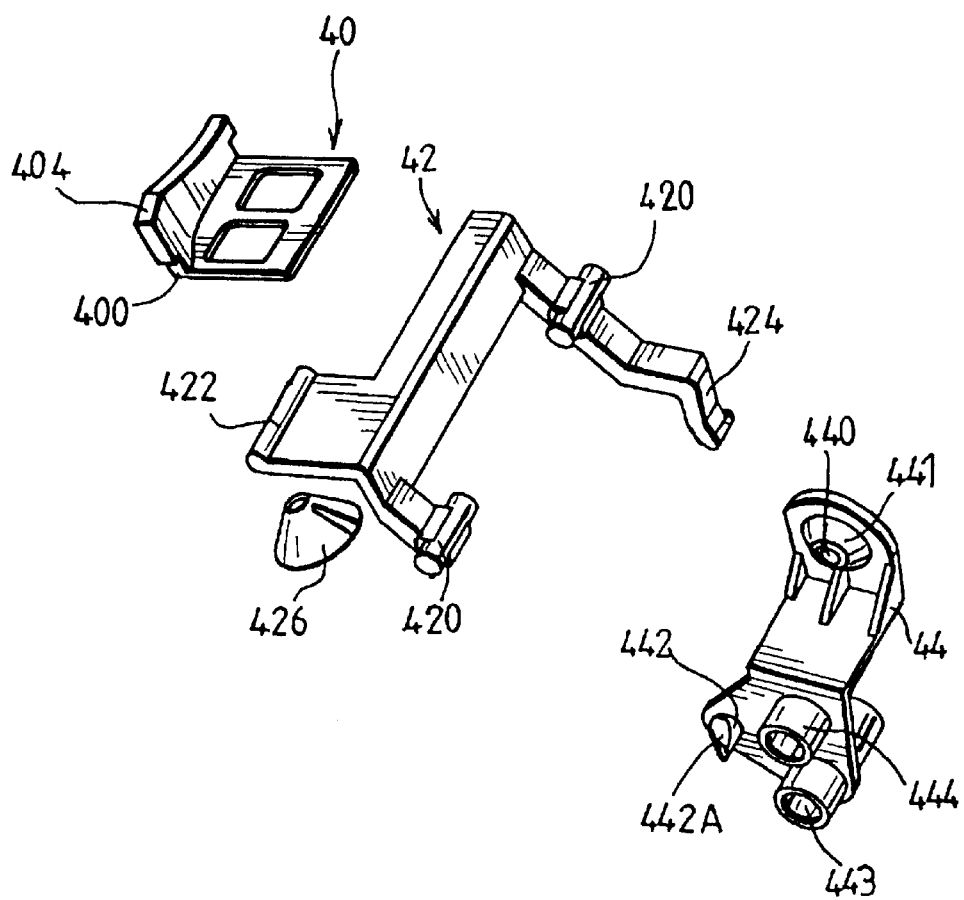
FIG. 7 is a fragmentary exploded perspective view of the driving mechanism of the preferred embodiment.

Referring to FIG. 2, the preferred embodiment of a disk drive assembly according to this invention is shown to include a hollow chassis 2, a module-mounting seat 3, a driving mechanism 4 (see FIG. 6), and a disk drive module 5.

Figure 2A:
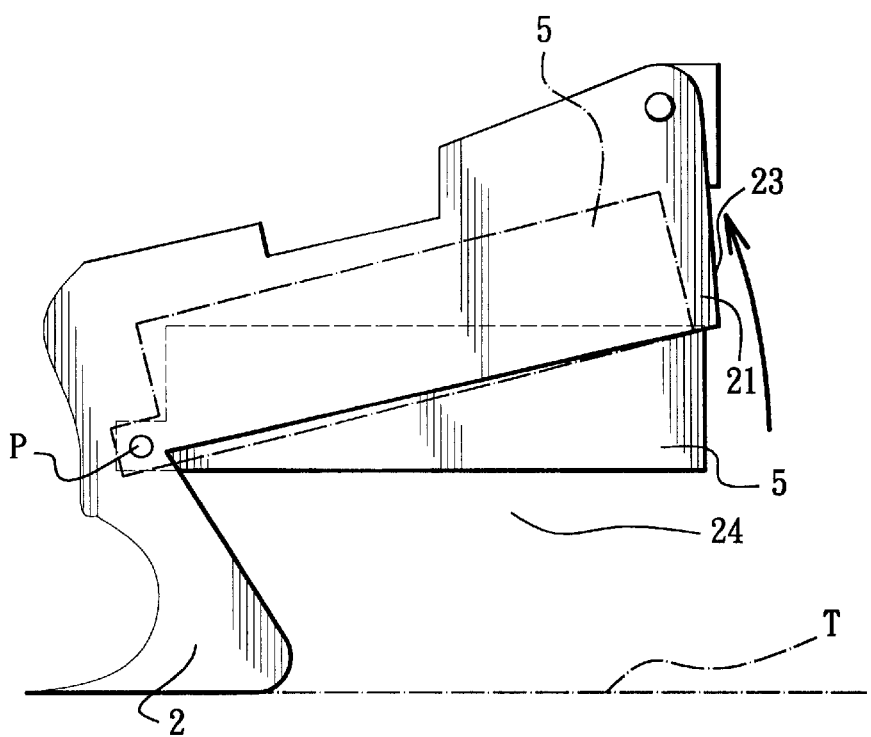
FIG. 2A is a schematic fragmentary side view of the preferred embodiment, illustrating how the seat is rotated from the exposed position to a concealed position.
Figure 3:
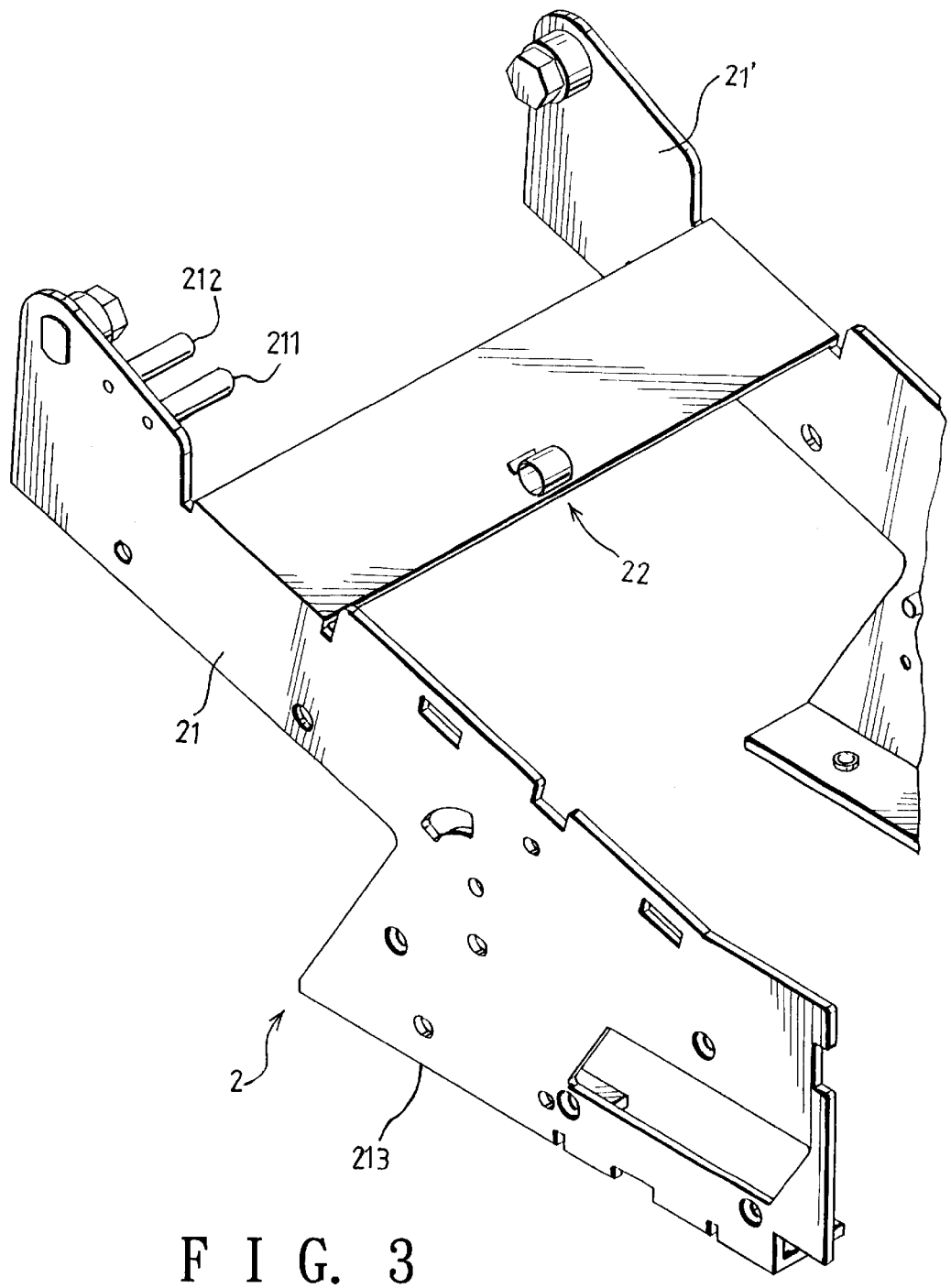
FIG. 3 is an assembled fragmentary perspective view of a chassis of the preferred embodiment.

Referring to FIGS. 2 and 3, the chassis 2 is disposed fixedly on the computer housing (not shown), and has two parallel vertical side walls 21, 21', a support pivot unit 22 for mounting an LCD monitor unit (not shown) thereon, and an upright front plate 23. The side wall 21 has a front end portion, which is formed with a long inner tube 211 and a short inner tube 212, each of which extends perpendicularly and inwardly therefrom. Each of the side walls 21, 21' is formed with an integral leg portion 213 at a rear end portion thereof for engaging a tabletop (T) (see FIG. 2A) or a floor. The front plate 23 and the tabletop (T) (see FIG. 2A) define an opening 24 therebetween.

Figure 4:
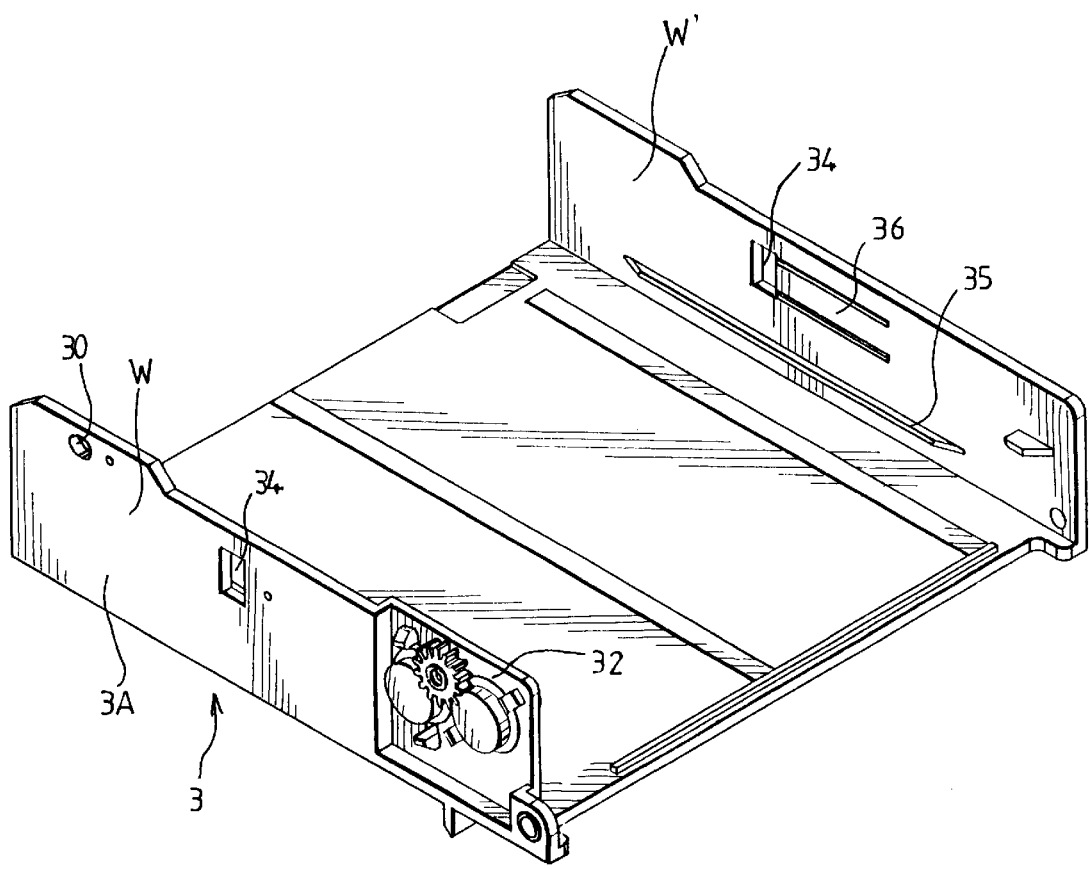
FIG. 4 is an assembled perspective view of a module-mounting seat of the preferred embodiment.
Figure 4A:
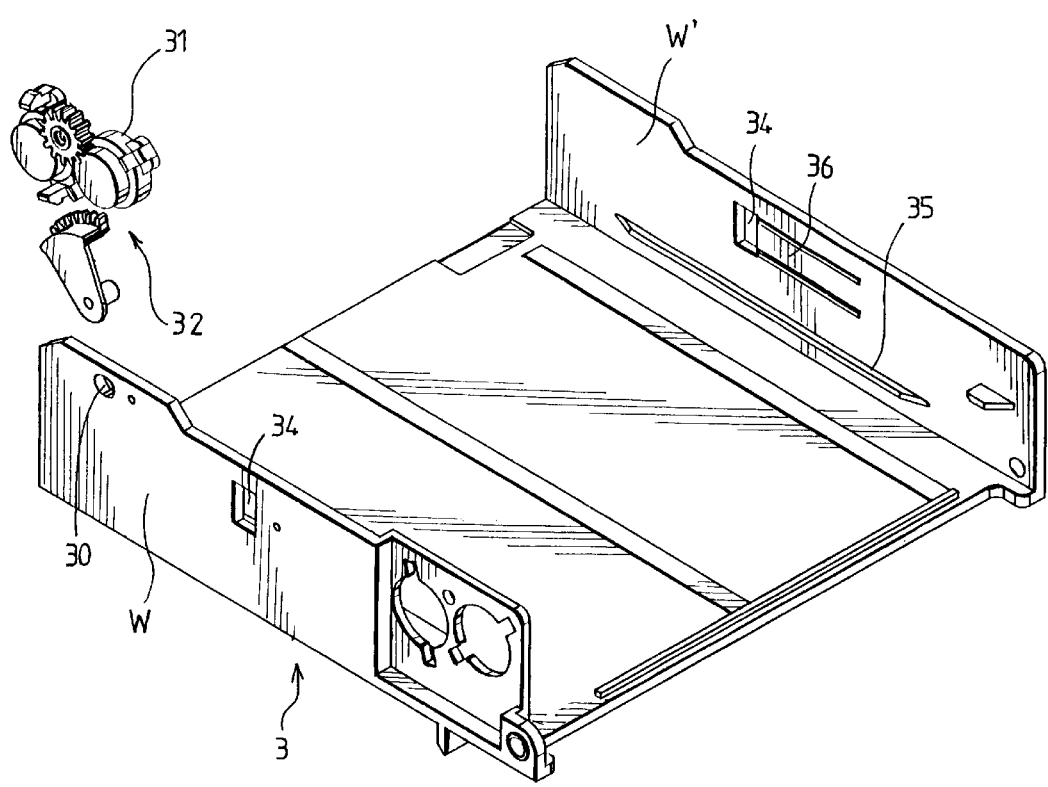
FIG. 4A is a partly exploded perspective view of the seat of the preferred embodiment.
Figure 5A:
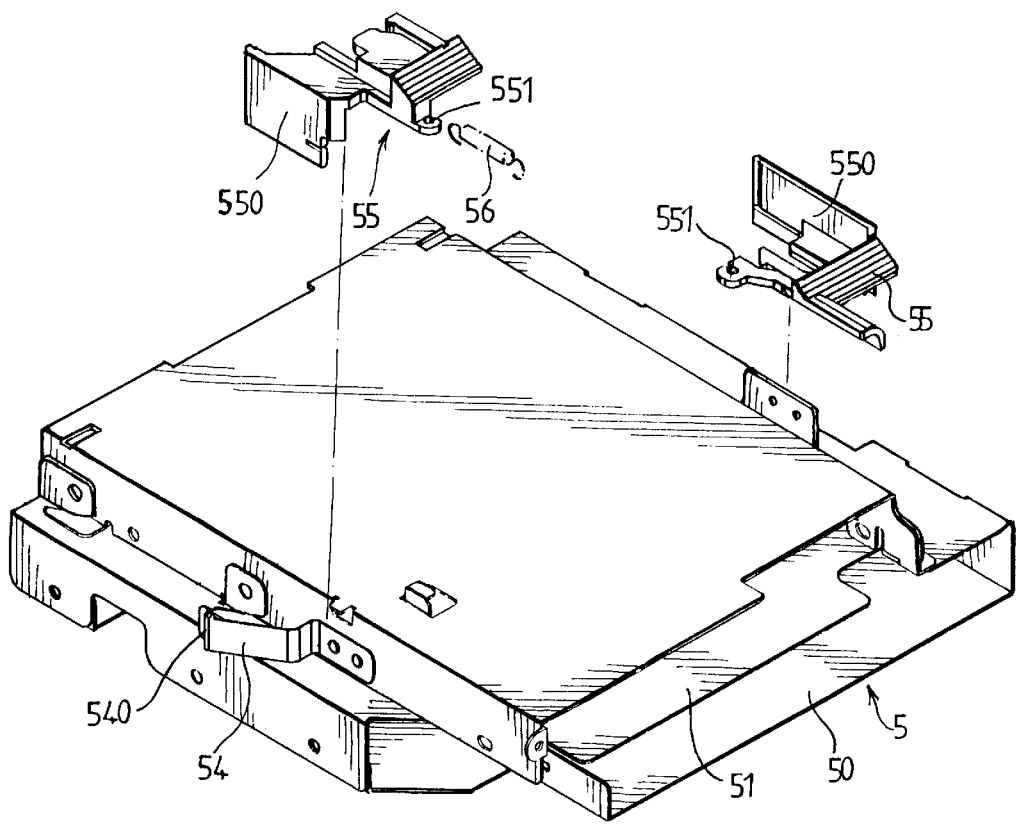
FIG. 5A is a partly exploded perspective view of the module of the preferred embodiment.

Referring to FIGS. 2, 4, and 4A, the seat 3 is disposed on the chassis 2, is coupled rotatably thereto by a horizontal pivot pin (P) (see FIG. 2), and includes two parallel vertical side walls (W, W'). The side wall (W) is formed with an engaging portion that is shaped as a hole 30. A biasing unit 31 (see FIG. 4A), such as a torsion spring unit, is disposed between the chassis 2 and the seat 3 for biasing the seat 3 to turn downward from a concealed position shown in phantom lines in FIG. 2A to an exposed position shown in solid lines in FIG. 2A. A damping device 32, such as a gearing, is disposed between the seat 3 and the chassis 2 so as to damp rotation of the seat 3 relative to the chassis 2.

Referring to FIGS. 2, 4, 4A, 5, 5A, and 5B, each of the side walls (W, W') has a hole 34, a lower rail unit 35, and an upper rail unit 36. The module 5 is slidable within the seat 3 along the lower and upper rail units 35, 36, and is formed with an optical-disk chamber 50 and a floppy-disk chamber 51 in a known manner. A quick release unit includes two resilient strips 54, two sliders 55, and two coiled tension springs 56. The module 5 is disposed between the side walls (W, W') of the seat 3 so as to define two slide slots (S) (see FIG. 5B) between the module 5 and the side walls (W, W') of the seat 3. The strips 54 have front ends that are fastened respectively to two opposite sides of the module 5. Each of the strips 54 is formed with a V-shaped strip portion 540 that extends into the corresponding slide slot (S) and that is inserted into the corresponding hole 34 in the side walls (W, W') of the seat 3 so as to fix the module 5 on the seat 3. The sliders 55 are received respectively and slidably within the slide slots (S), and are disposed in front of the V-shaped strip portions 540 of the strips 54. The tension springs 56 have front ends that are fastened respectively to the two opposite sides of the module 5, and rear ends that are fastened to the sliders 55 so as to bias the sliders 55 forwardly away from the V-shaped strip portions 540 of the strips 54. As such, the sliders 55 are spaced apart from the V-shaped strip portions 540 of the strips 54 when no external force is applied on the sliders 55. The sliders 55 have two vertical dividing walls 550 that are movable forcibly to press against the V-shaped strip portions 540 of the strips 54 so as to separate the V-shaped strip portions 540 from the holes 34 in the side walls (W, W') of the seat 3, thereby permitting removal of the module 5 from the seat 3. When the seat 3 is disposed at the exposed position, an outer end (5A) of the module 5 is exposed within the opening 24, as shown in FIG. 2. When the seat 3 is disposed at the concealed position, the module 5 is deflected from the opening 24 and is concealed behind the front plate 23 of the chassis 2, as shown in FIG. 2A, thereby preventing access of dust, sunlight, and water to the module 5 via the opening 24.

Referring to FIGS. 2, 6, 7, 7A, 7B, 7C, 7D, and 7E, the driving mechanism 4 includes an actuator member 40, a crank element 42, an engaging element 44, a retaining plate 46, and a biasing element in the form of a coiled compression spring 47.

The actuator member 40 includes a switch body 400 and a hollow rubber cone 401. The switch body 400 is disposed pivotally on the computer housing (not shown) at a pivot side 402, and has a finger-engaging portion 404.

The crank element 42 is unitary, and has two pivot pins 420, a first crank arm 422, and a second crank arm 424. Each of the pivot pins 420 is disposed rotatably within two C-shaped retaining rings 111 (see FIGS. 7A and 7B) of the computer housing 11 (see FIGS. 7A and 7B). The first crank arm 420 abuts against the switch body 400. The engaging element 44 includes a zigzag plate which has a first plate portion (44A), a second plate portion (44B), and a third plate portion (44C) that is parallel to the first plate portion (44A) and that is formed with an integral projection 440. The second plate portion (44B) is perpendicular to and interconnects the first and third plate portions (44A, 44C). The projection 440 is shaped as a truncated cone, and has an inclined surface 441 that engages the second crank arm 424 of the crank element 42, as shown in FIGS. 7C and 7D. The first plate portion 44A is formed integrally with a tongue 442, and two outer tubes 443, 444 that extend perpendicularly therefrom and that are sleeved respectively and movably on the long and short inner tubes 211, 212 of the chassis 2, thereby guiding the tongue 442 of the engaging element 44 to move toward and away from the hole 30 in the seat 3. Two headed bolts (B) extend respectively through the inner tubes 443, 444 to engage two nuts (N). The retaining plate 46 is sleeved on the bolts (B), and is clamped between the long inner tube 211 and one of the nuts (N). Clearances are formed between the inner tubes 443, 444 and the bolts (B) so as to permit radial movement of the inner tubes 443, 444 on the bolts (B). The biasing element 47 is sleeved on the outer tube 444 between the first plate portion (44A) and the retaining plate 46 so as to bias the first plate portion (44A) away from the retaining plate 46, thereby engaging the tongue 442 within the hole 30. As such, the engaging element 44 can move relative to the seat 3 between a disengagement position shown in solid lines in FIG. 7E, where the tongue 442 is disengaged from the hole 30, and an engagement position shown in phantom lines in FIG. 7E, where the tongue 442 engages the hole 30.

As shown in FIGS. 2, 2A, 6, and 7E, when the seat 3 is disposed at the concealed position shown in the phantom lines in FIG. 2A, and when no external force is applied on the actuator member 40, the tongue 442 is biased by the spring 47 to engage the hole 30 so as to prevent the seat 3 from being biased by the biasing unit 31 from the concealed position to the exposed position.

When it is desired to insert a recording medium (not shown), such as a floppy disk or an optical disk, into the module 5, the finger-engaging portion 404 of the actuator member 40 is tapped to rotate the crank element 42 against the biasing action of the rubber cone 401 so that the second crank arm 424 slides on the inclined surface 441 of the projection 440 of the engaging element 44 and so that the engaging element 44 moves away from the hole 30, thereby removing the tongue 442 from the hole 30. As such, the seat 3 is biased by the biasing unit 31 from the concealed position to the exposed position shown in FIG. 2, where the outer end (5A) of the module 5 is exposed within the opening 24 so as to permit insertion of the recording medium (not shown) into the module 5 in a known manner. When the actuator member 40 is released, it is returned to its original position by the shape-restoring action of the rubber cone 401, and the tongue 442 is biased by the spring 47 to press against the side wall 21 of the chassis 2.

Subsequently, the seat 3 can be pushed upward to the concealed position in view of the condition that a top end of the side wall (W) of the seat 3 can engage and slide on an inclined guide surface (442A) of the tongue 442. As such, the engaging element 44 is pushed by the side wall (W) to move away from the side wall 21 of the chassis 2. When the side wall (W) is rotated to align the tongue 442 with the hole 30, the engaging element 44 is biased by the spring 47 to move toward the side wall 21 so as to engage the tongue 442 within the hole 30, thereby retaining the seat 3 at the concealed position.

With this invention thus explained, it is apparent that numerous modifications and variations can be made without departing from the scope and spirit of this invention. It is therefore intended that this invention be limited only as indicated by the appended claims.

I claim:

1. A disk drive assembly adapted to be disposed within a computer housing, said disk drive assembly comprising:

a chassis adapted to be disposed fixedly on the computer housing and having an upright front plate that is adapted to define an opening in the computer housing;

a module-mounting seat disposed pivotally on said chassis and having an engaging portion, said seat being rotatable on said chassis between an exposed position and a concealed position;

a disk drive module attached to said seat and having an outer end that is aligned with and that is exposed within said opening when said seat is disposed at said exposed position, said module being deflected from said opening and being concealed behind said front plate of said chassis when said seat is disposed at said concealed position;

a biasing unit for biasing said seat from said concealed position to said exposed position; and a driving mechanism including an engaging element aligned with said engaging portion of said seat when said seat is disposed at said concealed position, a biasing element for biasing said engaging element to engage said engaging portion of said seat when said seat is disposed at said concealed position, thereby retaining said seat at said concealed position, and an actuator member connected operably to said engaging element and operable so as to remove said engaging element from said engaging portion of said seat against biasing action of said biasing element when said seat is disposed at said concealed position, such that said seat is biased by said biasing unit to rotate from said concealed position to said exposed position, after which said seat can be rotated forcibly from said exposed position to said concealed position such that said engaging element engages said engaging portion of said seat by action of said biasing element when said actuator member is released.

2. The disk drive assembly as claimed in claim 1, wherein said actuator member is adapted to be disposed operably on the computer housing, said engaging element being guided to move toward and away from said engaging portion of said seat and including an integral projection that is shaped as a truncated cone and that has an inclined surface, said driving mechanism further including a crank element, which is adapted to be disposed pivotally on the computer housing and which has a first crank arm that engages said actuator member and that is rotatable upon actuation of said actuator member, and a second crank arm that engages said inclined surface of said projection of said engaging element and that is rotatable upon actuation of said actuator member so as to slide on said inclined surface, thereby removing said engaging element from said engaging portion of said seat.

3. The disk drive assembly as claimed in claim 2, wherein said actuator member includes:

a switch body adapted to be disposed pivotally on the computer housing and operable so as to rotate said first crank arm when a force is applied on said switch body; and a hollow rubber cone for returning said switch body to an original position when said switch body is released.

4. The disk drive assembly as claimed in claim 2, wherein said chassis is formed with two fixed parallel inner tubes, said engaging element further including:

a plate portion fixed relative to said projection;

two outer tubes formed integrally with said plate portion and sleeved respectively and movably on said inner tubes, said outer tubes extending perpendicularly from said plate portion so as to guide said engaging element to move toward and away from said engaging portion of said seat;

two bolts extending respectively through and retained on said inner tubes; and a retaining plate sleeved movably on said bolts;

said biasing element being constructed as a coiled compression spring that is sleeved on one of said outer tubes between said retaining plate and said plate portion of said engaging element so as to position said retaining plate on said bolts, thereby biasing said plate portion of said engaging element away from said retaining plate.

5. The disk drive assembly as claimed in claim 4, wherein said seat includes a vertical side wall, which is formed with a hole that constitutes said engaging portion, said engaging element including a tongue that projects integrally from said plate portion and that engages said engaging portion when said seat is disposed at said concealed position and when no external force is applied on said actuator member.

6. The disk drive assembly as claimed in claim 5, wherein said tongue has an inclined guide surface that permits sliding movement of said side wall of said seat thereon during rotation of said seat from said exposed position to said concealed position, thereby facilitating engagement between said tongue and said hole in said side wall of said seat.

7. The disk drive assembly as claimed in claim 1, further comprising a damping device, which is disposed between said seat and said chassis so as to damp rotation of said seat relative to said chassis.

8. The disk drive assembly as claimed in claim 1, wherein said seat includes two parallel vertical side walls that are formed respectively with two aligned holes therethrough, said module being disposed between said side walls of said seat so as to define two slide slots between said module and said side walls of said seat, said disk drive assembly further including a quick release unit, which has:

two resilient strips having front ends that are fastened respectively to two opposite sides of said module, each of said strips being formed with a V-shaped strip portion that extends into a respective one of said slide slots and that is inserted into a respective one of said holes in said side walls of said seat so as to fix said module on said seat;

two sliders received respectively and slidably within said slide slots and disposed in front of said V-shaped strip portions of said strips; and two coiled tension springs having front ends that are fastened respectively to the two opposite sides of said module, and rear ends that are fastened to said sliders so as to bias said sliders away from said V-shaped strip portions of said strips such that said sliders are spaced apart from said V-shaped strip portions of said strips when no external force is applied on said sliders, said sliders being movable forcibly to press against said V-shaped strip portions of said strips so as to separate said V-shaped strip portions of said strips from said holes in said side walls of said seat, thereby permitting removal of said module from said seat.

* * * * *